United States Patent [19]
Kinjo et al.

[11] Patent Number: 5,701,437
[45] Date of Patent: Dec. 23, 1997

[54] DUAL-MEMORY MANAGING APPARATUS AND METHOD INCLUDING PRIORITIZATION OF BACKUP AND UPDATE OPERATIONS

[75] Inventors: Morishige Kinjo; Eiji Ishibashi, both of Tokyo, Japan

[73] Assignee: Kabushiki Kaisha Toshiba, Kawasaki, Japan

[21] Appl. No.: 710,088

[22] Filed: Sep. 10, 1996

Related U.S. Application Data

[63] Continuation of Ser. No. 130,508, Oct. 1, 1993, abandoned.

[30] Foreign Application Priority Data

Oct. 2, 1992 [JP] Japan ................... 4-264565

[51] Int. Cl.⁶ ................... G06F 11/16; G06F 12/16
[52] U.S. Cl. ................... 395/489; 395/473; 395/492; 395/841; 395/468
[58] Field of Search ................... 395/473, 492, 395/250, 841, 488, 489, 468

[56] References Cited

U.S. PATENT DOCUMENTS

| | | | |
|---|---|---|---|
| 5,193,154 | 3/1993 | Kitajima et al. | 395/250 |
| 5,239,637 | 8/1993 | Davis et al. | 395/492 |
| 5,247,618 | 9/1993 | Davis et al. | 395/841 |
| 5,319,766 | 6/1994 | Thauer et al. | 395/473 |

*Primary Examiner*—Tod R. Swann
*Assistant Examiner*—J. Peikari
*Attorney, Agent, or Firm*—Finnegan, Henderson, Farabow, Garrett & Dunner, L.L.P.

[57] ABSTRACT

According to this invention, a dual-memory managing apparatus is applied to a system in which a plurality of memories and a plurality of processors are connected to each other through a data bus, and the dual-memory managing apparatus is a dual-memory managing apparatus for performing control performed when a memory copy operation from at least one first memory to at least one second memory system. The dual-memory managing apparatus includes a means for performing the memory copy operation for each word, and when write access from the plurality of processors to the plurality of memories is performed at almost the same timing as that of the memory copy operation, a control means for parallelly performing the memory write access and the memory copy operation when an address of the write access is different from an address subjected to the memory copy operation, and for preferentially performing the write access when the address of the write access is identical to the address subjected to the memory copy operation.

10 Claims, 8 Drawing Sheets

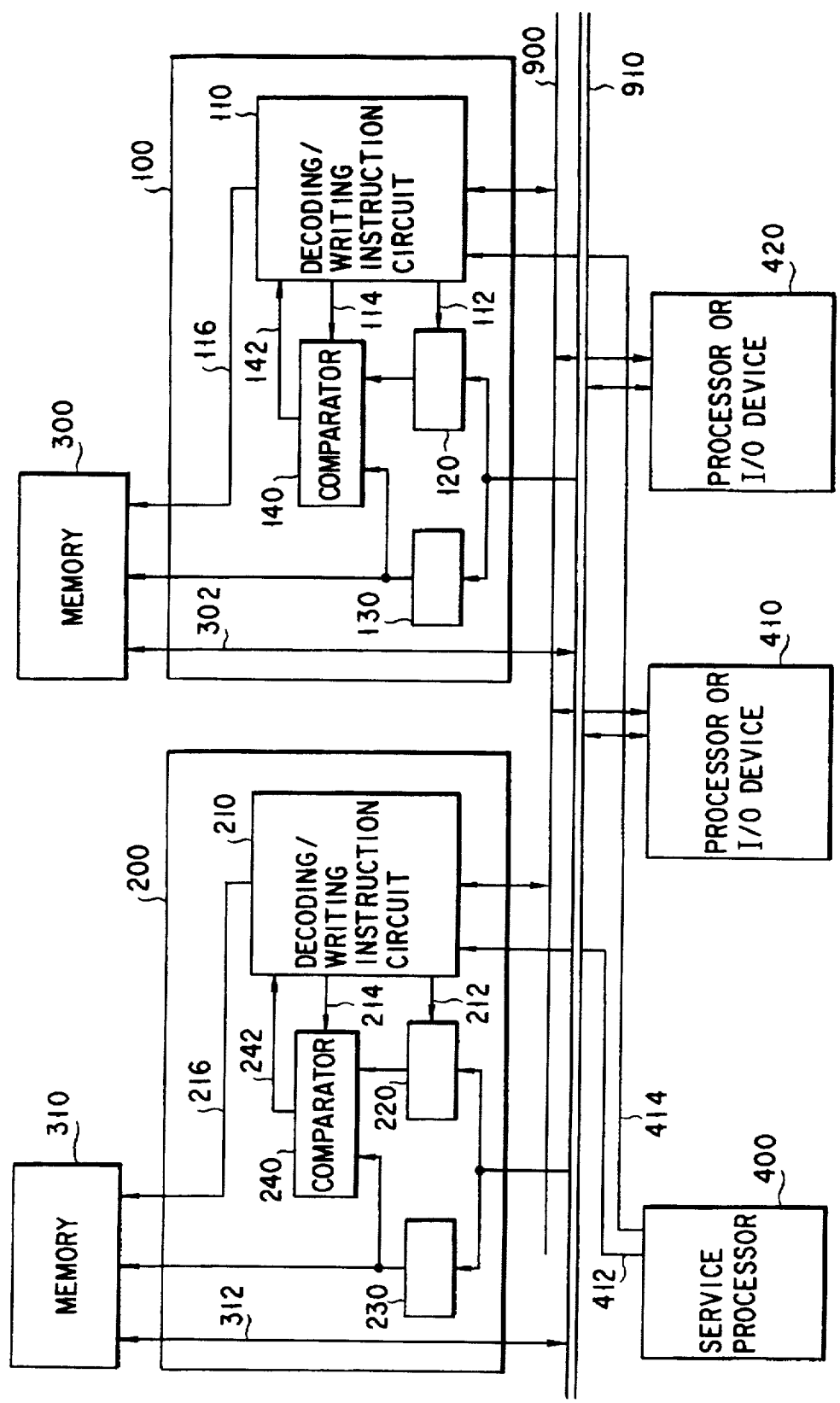
F I G. 1

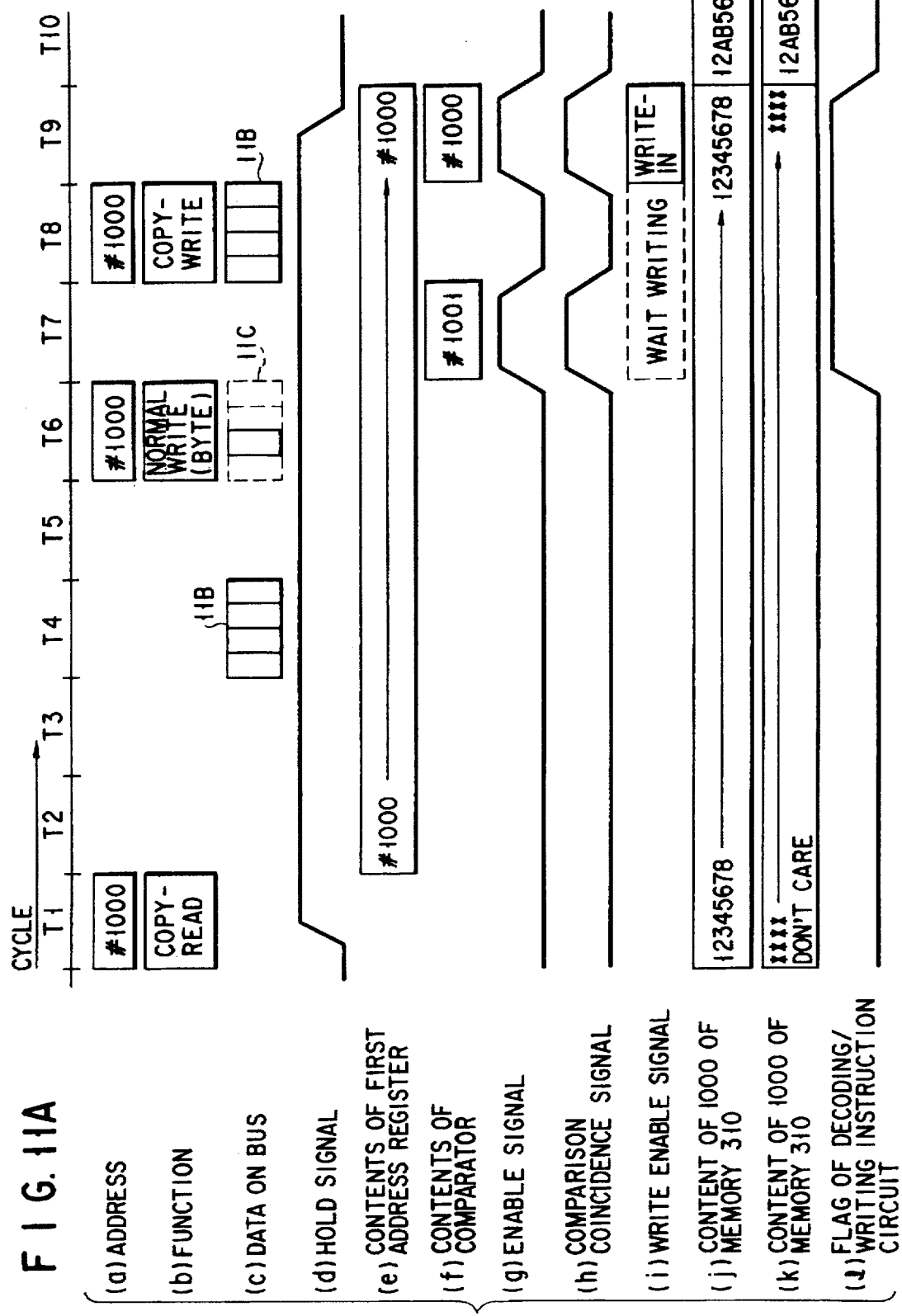

DUAL-MEMORY MANAGING APPARATUS AND METHOD INCLUDING PRIORITIZATION OF BACKUP AND UPDATE OPERATIONS

This is a continuation of application Ser. No. 08/130,508, filed Oct. 1, 1993, now abandoned.

BACKGROUND OF THE INVENTION

1. Field of the Invention

The present invention relates to a dual-memory managing apparatus for storing identical data in a plurality of memories using a processor and, more particularly, to a dual-memory managing apparatus for performing a memory copy operation without complicating a hardware mechanism and software control.

2. Description of the Related Art

A dual-memory system for making a memory dual to protect data is generally employed in a computer. This dual-memory system is a system in which identical data are stored in at least two memories as first and second memories, and is employed for the purpose of improving protection of the data. In this dual-memory system, when the first memory of the first and second memories has failed, the first memory is repaired, and the data stored in the second memory is copied in the repaired first memory. With this memory copy operation, the data stored in the first memory is identical to the data stored in the second memory.

As the first memory copy scheme, the following system is known. That is, access from another processor including an input/output device is inhibited, and all data stored in the second memory are copied in the first memory.

However, according to the first memory copy scheme, a period of time is required for copying all the data of the second memory in the first memory, and another processor cannot access the first and second memories for this period of time. For this reason, the first scheme causes degradation of processing capability of the apparatus.

As the second memory copy scheme, the following system is known. That is, the first memory is divided into unit blocks, data stored in the second memory is copied in each of the unit blocks.

However, in the second memory copy scheme, a hardware mechanism such as a circuit for inhibiting access of a processor or the like to a block region serving as a unit of a memory copy operation is complicated, and software for checking whether data is written in the block region serving as a unit of copy by another processor or the like is required. Therefore, according to the second scheme, the hardware mechanism and the software control are complicated.

SUMMARY OF THE INVENTION

It is an object of the present invention to provide a dual-memory managing apparatus, which is capable of preventing degradation of processing capability of the apparatus in a memory copy mode, has a simple hardware arrangement, and can be easily controlled by software.

The dual-memory managing apparatus of the present invention, which is connected to a plurality of memories and a plurality of processors through a data bus, applied to a system constituted such that identical data are stored in the plurality of memories, and controls when a memory copy operation is performed from at least one first memory to at least one second memory, characterized by comprising means for performing the memory copy operation for each word; and when write access of the plurality of processors to the plurality of memories is performed at almost the same timing as that of the memory copy operation, control means for parallelly performing the memory write access and the memory copy operation when an address of the write access is different from an address subjected to the memory copy operation, and for preferentially performing the write access when the write address is identical to the address subjected to the memory copy operation. The control means is characterized by including means for setting the write access in a standby state and performing write access to the plurality of memories upon completion of the memory copy operation, when the write address coincides with the address subjected to the memory copy operation, and the memory copy operation is performed before the write access is performed and including means for canceling the copy operation of the address when the write address coincides with the address subjected to the memory copy operation, and the write access is performed before the memory copy operation is performed.

In addition, there is provided means for writing data in the plurality of memories after a corresponding portion of contents of the memory copy operation is replaced with contents of the write access when the write access is shorter than a word length subjected to the memory copy operation, and the write address is included in the address subjected to the memory copy operation.

More specifically, the dual-memory managing apparatus of the present invention applied to a system which has a plurality of memories and a plurality of processors connected to each other through a data bus is constituted such that identical data are stored in the plurality of memories, the dual-memory managing apparatus performing control when a memory copy operation is performed from at least one first memory to at least one second memory, is characterized by comprising means for performing the memory copy operation for each word first latch; means for latching a read address from the first memory designated by one of the plurality of processors; second latch means for latching a write address designated by one of the plurality of processors; comparison means for comparing the read address latched by the first latch means with the write address latched by the second latch; and control means for controlling the memory copy operation in accordance with the presence/absence of write access from one of the plurality of processors to the plurality of memories when the write address coincides with the read address.

In a system which has a plurality of memories and a plurality of processors connected to each other through a data bus and is constituted such that identical data are stored in the plurality of memories, a dual-memory managing method of the present invention for performing control when a memory copy operation is performed from at least one first memory to at least one second memory, is characterized by comprising the first step of transmitting a write address and a read address for performing the memory copy operation from one of the plurality of processors; the second step of comparing the read address with the write address; and the third step of performing the memory copy operation on the basis of a comparison result; wherein the third step includes the step of performing the write access to the memories upon completion of the memory copy operation when a write instruction is transmitted from one of the plurality of processors to the plurality of memories during the memory copy operation, and the third step includes the step of canceling the memory copy operation upon completion of the write access to the memories when a write instruction is transmitted from one of the plurality of processors to the plurality of memories before the memory copy operation is performed.

According to the present invention, an address latched by a second address register for latching a write address from a processor to a plurality of memories is compared with an address latched in a first address register for latching a read address from the processor to memories of copy source. As a result, when the address latched in the first register coincides with the address latched in the second address register, in case of no write instruction from other processors, write access (copy) of the identical address to a memory for each word is enabled.

In the above arrangement, when a write instruction from the processor except memory copy contends with a memory copy instruction at the same address, the following operations are performed. (1) When a memory copy instruction is executed in a normal memory write mode, the memory copy instruction is canceled. (2) When a normal write instruction is executed in the memory copy mode, write access is set in a standby state, and the normal write access is executed in the next clock.

Since the memory copy operation is performed by the above method, the memory copy operation can be performed without complicating a hardware mechanism and lowering capacity of the apparatus.

In addition, when data in units of bytes is written in the memory copy mode, write data is combined with the copy data, and the combined data is written in the memory. For this reason, copy efficiency is improved.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing control of a dual-memory managing apparatus according to the first embodiment of the present invention;

DETAILED DESCRIPTION OF THE PREFERRED EMBODIMENTS

Figure 2:
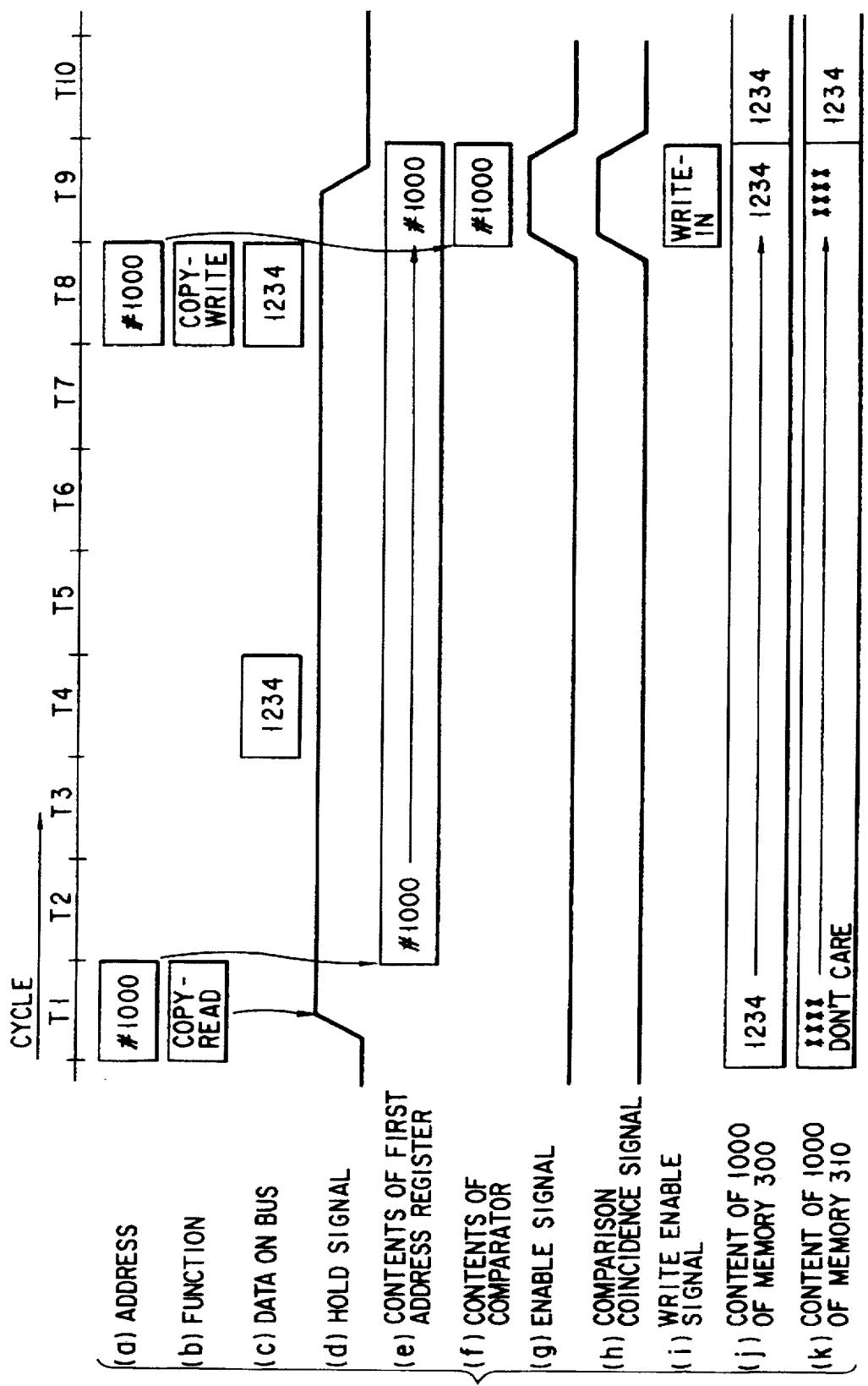
FIG. 2 including (a) to (k) is a timing chart showing an operation of the first embodiment of the present invention.

An embodiment of the present invention will be described below with reference to the accompanying drawings.

FIG. 1 is a block diagram showing control of a dual-memory managing apparatus according to the first embodiment of the present invention.

Referring to FIG. 1, a first memory managing device 100 and a second memory managing device 200 respectively control storage of data in memories 300 and 310, and are connected to a service processor 400, a processor 410, and a processor 420 through a control line 900 and a system bus 910.

The first memory managing device 100 comprises a decoding/writing instruction circuit 110, a first address register 120, a second address register 130, and a comparator 140. The second memory managing device 200 comprises a decoding/writing instruction circuit 210, a first address register 220, a second address register 230, and a comparator 240.

The decoding/writing instruction circuit 110 decodes a command (e.g., a 4-bit command) representing the type of memory access and transmitted from the processor 410 or the processor 420 through the control line 900. With the decoding of the command, in an operation of writing data in the memory 300 in a normal state, or in a memory copy operation in which data stored in the memory 300 is copied in the memory 310, the decoding/writing instruction circuit 110 enables a signal 116 connected to the memory 300 and representing a write enable state. In the memory copy mode, the decoding/writing instruction circuit 110 enables a hold signal 112, and the first address register 120 receives the read address of the memory 300 input from the processor 410 or the processor 420 and latches the read address on the basis of the hold signal 112.

The second address register 130 latches a normal write address of the memory 300 input from the processor 410 or the processor 420 through the system bus 910, or latches a write address in the memory copy mode.

The comparator 140 compares the address latched in the first address register 120 with the address latched in the second address register 130 when a signal line 114 connected to the decoding/writing instruction circuit 110 becomes enable. When the addresses coincide with each other, a signal 142 representing a coincidence and connected to the decoding/writing instruction circuit 110 is activated.

The second memory managing device 200 comprises the decoding/writing instruction circuit 210, the first address register 220, the second address register 230, and the comparator 240.

The decoding/writing instruction circuit 210 decodes a command (e.g., a 4-bit command) representing the type of memory access and transmitted from the processor 410 or the processor 420 through the control line 900. With the decoding of the command, in an operation of writing data in the memory 300 in a normal state, or in a memory copy mode in which data stored in the memory 300 is stored in the memory 310, the decoding/writing instruction circuit 210 enables the write enable signal 216 connected to the memory 300. In the memory copy mode, the decoding/writing instruction circuit 210 enables the hold signal 212, and the first address register 220 receives a read address of the memory 300 input from the processor 410 or the processor 420, and latches the read address on the basis of the hold signal 212.

The second address register 230 latches a normal write address of the memory 300 input from the processor 410 or the processor 420 through the system bus 910, or latches a write address in the memory copy mode.

The comparator 240 compares the address latched in the first address register 220 with the address latched in the second address register 230 when a signal line 214 connected to the decoding/writing instruction circuit 210 becomes enable. When the addresses coincides with each other, the signal 242 representing a coincidence and connected to the decoding/writing instruction circuit 210 is activated.

The first memory managing device 100 comprises a data bus 302 for transmitting data output from the processor 410 or the processor 420 to the memory 300.

The second memory managing device 200 comprises a data bus 312 for transmitting data output from the processor 410 or the processor 420 to the memory 310.

The service processor 400 identifies any one of the first memory managing device 100 and the second memory managing device 200. The service processor 400 transmits a command representing a copy source in the memory copy mode to the first memory managing device 100 and the memory 300 through a signal line 412, and transmits a command representing a copy destination to the second memory managing device 200 and the memory 310 through a signal line 414.

The processor 410 and the processor 420 access predetermined addresses of the memory 300 and the memory 310 to read and write data. Each of the processor 410 and the processor 420 may be an input/output device such as a keyboard.

An operation of the apparatus according to this embodiment arranged as described above will be considered in a case wherein a failure has occurred in the memory 310, and a memory copy operation is performed from the memory 300 to the memory 310. In a memory copy mode in which data stored at a predetermined address of the memory 300 is stored in the memory 310 which is repaired after the failure, a read address in a memory copy mode is latched from the processor 410 to the first address register 120, a write address in the memory copy mode is latched in the second address register 130. When the comparator 140 compares data in the first address register 120 with data in the second address register 130, if the register data coincide with each other, the comparator 140 activates the signal 142 representing a coincidence. When the signal 142 is activated, the decoding/writing instruction circuit 110 enables the signal 116 representing a write enable state, thereby starting a memory copy operation from the memory 300 to the memory 310.

In the memory copy mode, the processor 420 transmits an address to the second address register 130 through the system bus 910 to write data in the memory 300. When the address is transmitted to the second address register 130, the comparator 140 compares data in the first address register 120 with data in the second address register 130. If the data in the first address register 120 coincides with the data in the second address register 130, the comparator 140 activates the signal 142. When the signal 142 is activated, the decoding/writing instruction circuit 110 disables the signal 116 representing a write enable state because a flag (not shown) representing that a memory is being copied is set in an ON state in advance. In this manner, write access from the processor 420 to the memory 300 is inhibited, thereby setting a standby state. When the memory copy operation is completed, write access from the processor 420 to the memory 300 and the memory 310 is enabled because the signal 116 becomes enabled, and the processor executes write access to the memories 300 and 310. As described above, the identical data can be held in the memory 300 and the memory 310.

An operation of the first embodiment of the present invention will be described below with reference to the timing charts in FIGS. 2 and 3.

Figure 3:
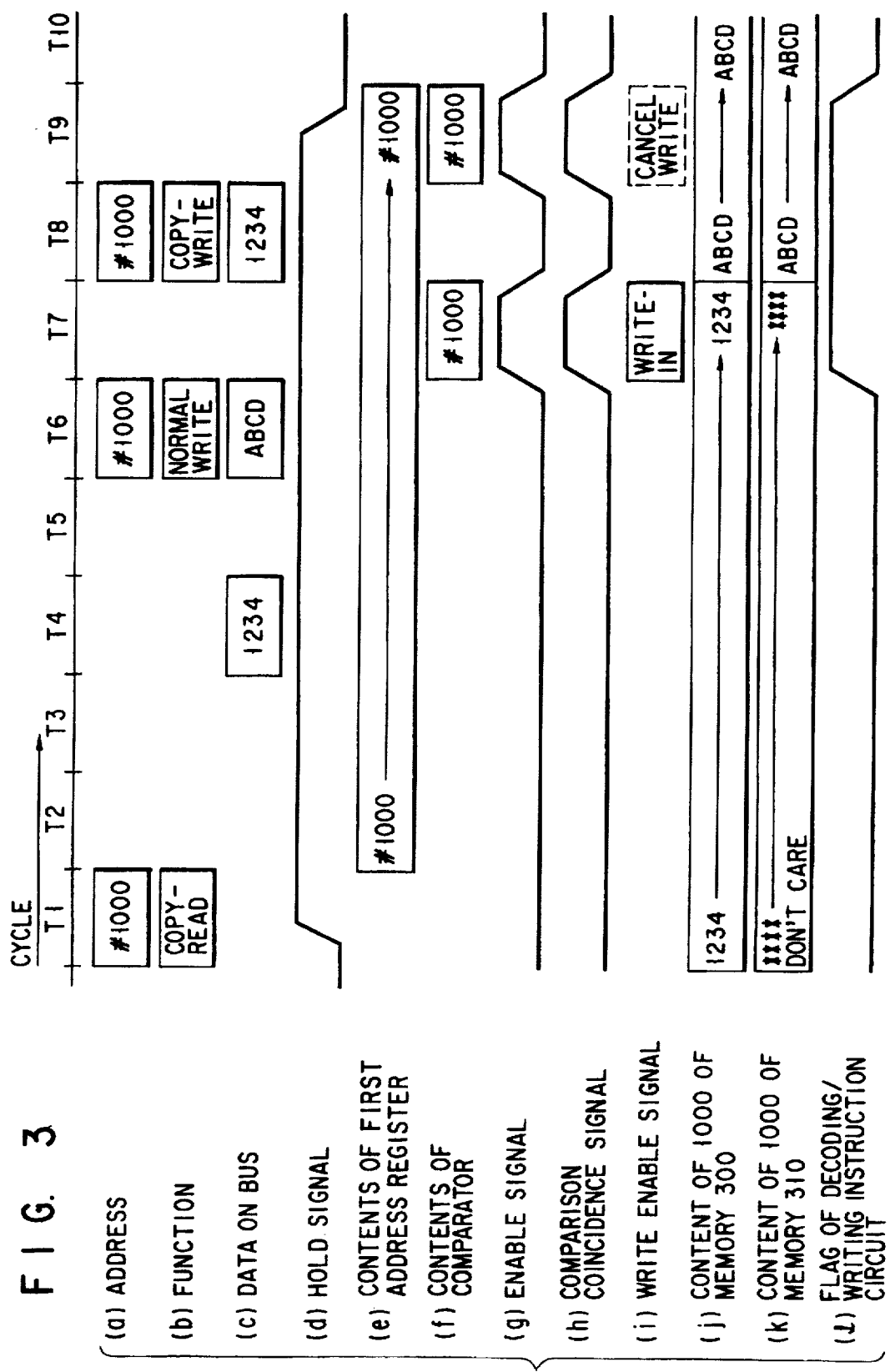
FIG. 3 including (a) to (l) is a timing chart showing another operation of the first embodiment of the present invention.

FIG. 2 including (a) to (k) is a timing chart showing an operation of the first embodiment of the present invention, and FIG. 3 including (a) to (l) is a timing chart showing another operation of the first embodiment of the present invention.

After the memory 310 is repaired, while data stored at a predetermined address of the memory 300 is copied in an area at a predetermined address of the memory 310, write access from another processor to the identical addresses is not executed. This state will be described below with reference to the timing charts in (a) to (k) of FIG. 2.

The service processor 400 transmits, to the decoding/writing instruction circuits 110 and 210 through the signal lines 412 and 414, a command representing that the memory 300 and the memory 310 are a copy source and a copy destination, respectively. After the command is transmitted from the service processor 400, the processor 410 reads out data at address 1000 in the memory copy mode ((a) of FIG. 2). The processor 410 shown in (b) of FIG. 2 or the control line 900 connected to the processor 420 represents a function representing a read cycle of a memory copy operation (cycle T1). At this time, "1234" is stored at address 1000 of the memory 300.

The decoding/writing instruction circuits 110 and 210 decode the command transmitted from the processor 410, and then recognize the command as a memory copy command to enable the hold signals 112 and 212 for the first address register 120 and the first address register 220 ((d) of FIG. 2). When the hold signal 112 is enabled, as shown in (e) of FIG. 2, the first address registers 120 and 220 latch address 1000 output from the processor 410 (cycle T2).

After the address 1000 is latched in the first address registers 120 and 220, as shown in (c) of FIG. 2, the first memory managing device 100 transmits data "1234" from address 1000 of the memory 300 to the processor 410 through the data bus 302 (cycle T4).

When the data "1234" is transmitted to the processor 410, the processor 410, as shown in (b) of FIG. 2, transmits an instruction representing write access of a memory copy operation to the decoding/writing instruction circuits 110 and 210 through the control line 900 (cycle T8).

After the decoding/writing instruction circuits 110 and 230 receive this instruction, the second address register 130 and the second address register 230 latch write address 1000 ((f) of FIG. 2). After the address is latched, the decoding/writing instruction circuits 110 and 210 enable the signal lines 116 and 216 ((i) of FIG. 2), respectively, and data "1234" is written at address 1000 of the memory 310 (cycle T9).

When the data "1234" is written, in the memory 310, as shown in (k) of FIG. 2, the data "1234" is stored at address 1000 (cycle T10).

While the above operation is repeated, data stored in the memory 300 is stored in the memory 310.

A case wherein data is stored at an identical address of the memories 300 and 310 by the processor 420 in a memory copy operation executed from the memory 300 to the memory 310 by the processor 410 will be described below with reference to the timing charts in (a) to (l) of FIG. 3.

The decoding/writing instruction circuits 110 and 210 decode a command transmitted from the service processor 400 through the control line 900 to recognize the memory 300 and the memory 310 as a copy source and a copy destination, respectively, and to enable the hold signals 112 and 212 for the first address register 120 and the first address register 220 ((a), (b) and (d) of FIG. 3). When the hold signals 112 and 212 are enabled, as shown in (e) of FIG. 3, the first address registers 120 and 220 latch address 1000 from the processor 410 (cycles T1 and T2).

After address 1000 is latched in the first address registers 120 and 220, the first memory managing device 100, as shown in (c) of FIG. 3, transmits data "1234" from address 1000 of the memory 300 to the processor 410 through the data bus 302 (cycle T4).

After the data "1234" is transferred to the processor 410, the processor 420 sets a normal write function through the control line 900, and data "ABCD" is written at addresses 1000 of the memories 300 and 310 ((a) and (c) of FIG. 3). For this reason, address 1000 is output to the second address register 130 and the second address register 230 through the system bus 910, and the data "ABCD" is transmitted through the data bus 302 and a data bus 312 (cycle T6).

The second address registers 130 and 230 latch write address 1000 through the system bus 910 ((f) of FIG. 3). When the address is latched in the second address registers 130 and 230, the decoding/writing instruction circuits 110 and 210 enable the signal line 114 and a signal line 214 ((g) of FIG. 3). When the signal lines 114 and 214 are enabled, the comparator 140 compares the address latched in the first address register 120 with the address latched in the second address register 130, and the comparator 240 compares the address latched in the first address register 220 with the address latched in the second address register 230. In these comparison operations, the addresses latched in the first address register 120 and the second address register 130 are identical to each other, i.e., address 1000. For this reason, the comparator 140 activates the signal line 142 representing write coincidence ((h) of FIG. 3). Similarly, since the addresses latched in the first address register 220 and the second address register 230 are identical to each other, i.e., address 1000, the comparator 240 activates a signal line 242 representing write coincidence (cycle T7).

When the signal line 242 is enabled, the decoding/writing instruction circuits 110 and 210 sets high a flag representing that the write access is identical to normal write access, i.e., a flag (not shown) arranged in each of the circuits. After the flag is set high, the decoding/writing instruction circuits 110 and 210 enable the signal lines 116 and 216 each representing a write enable state. In this manner, data "ABCD" is written at addresses 1000 of the memories 300 and 310 shown in (j) and (k) of FIG. 3 through the data buses 302 and 312 (cycles T7 to T8).

A copy write function for writing the data "1234" in cycle T1 is output by the processor 410 to the decoding/writing instruction circuits 110 and 210 through the control line 900.

The processor 410 transmits the data "1234" to the memories 300 and 310 through the data buses 302 and 312 and outputs write distinction address 1000 to each of the second address registers 130 and 230 ((a) to (c) of FIG. 3).

When the second address registers 130 and 230 latch the addresses each representing write access, the decoding/writing instruction circuits 110 and 210 enable the signal lines 114 and 214 ((g) of FIG. 3). When the signal lines 114 and 214 are enabled, the comparator 140 compares the address latched in the first address register 120 with the address latched in the second address register 130, and the comparator 240 compares the address latched in the first address register 220 with the address latched in the second address register 230 ((e) and (f) of FIG. 3). Since the compared addresses coincide with each other, the comparators 140 and 240 activate the signal lines 142 and 242 each representing a write coincidence ((h) of FIG. 3).

When the signal lines 142 and 242 are activated, the decoding/writing instruction circuits 110 and 210 determine that write access from the processor 420 to the identical address, i.e., address 1000, is performed, because the flag (not shown) representing the write access coincides with normal write access goes high. Write access to the addresses latched in the second address registers 130 and 230 is canceled. Therefore, the decoding/writing instruction circuits 110 and 210 disable the signal lines 116 and 216 representing a write enable state. Since the signal lines 116 and 216 are disabled, data "1234" is not written in the memories 300 and 310 represented by the enable addresses latched in the second address registers 130 and 230 ((i) of FIG. 3).

With the above operation, the data "ABCD" written in the normal write mode is kept stored at addresses 1000 of the memories 300 and 310 (cycles T9 to t10).

Figure 4:
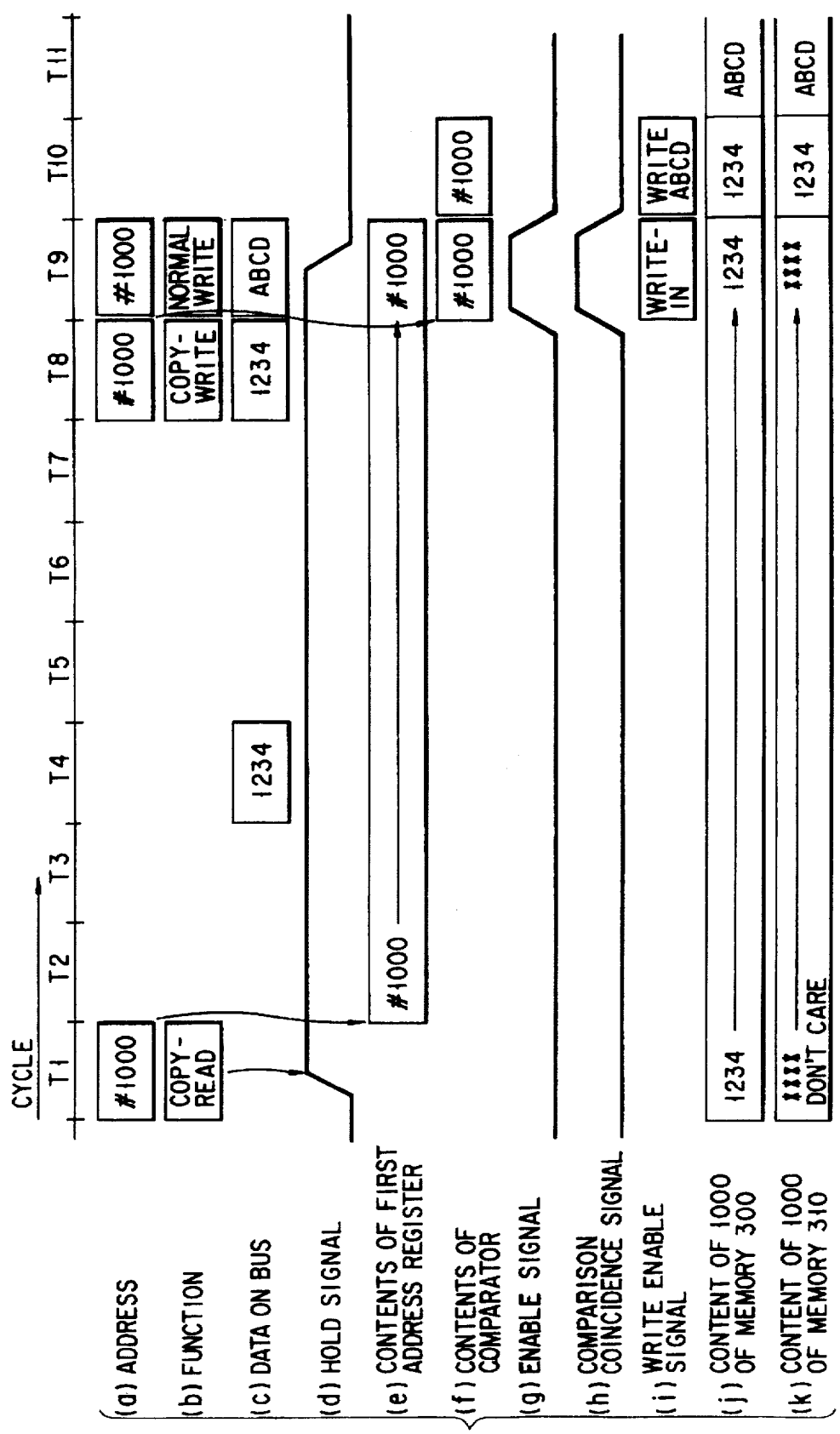
FIG. 4 including (a) to (k) is a timing chart showing an operation of the second embodiment of the present invention.

In the first embodiment, when a write instruction is transmitted from another processor, only the write instruction from the processor is executed without performing a memory copy operation. The second embodiment will describe a case wherein, while a memory copy operation is performed at a given address, a write instruction for the given address is transmitted from a processor. FIG. 4 including (a) to (k) is a timing chart showing an operation of the second embodiment of the present invention. Since the arrangement of the apparatus of the second embodiment is the same as that of the first embodiment, a description thereof will be omitted. In above construction, a function of waiting write request output from the processors is added to the control line 900.

A service processor 400 transmits, to decoding/writing instruction circuits 110 and 210 through signal lines 412 and 414, a command representing that memories 300 and 310 are a copy source and a copy destination, respectively. After the command is transmitted from the service processor 400, a processor 410 performs read access to address 1000 in a memory copy mode ((a) of FIG. 4). A control line 900 connected to the processor 410 shown in (b) of FIG. 4 or a processor 420 represents a function representing read access in the memory copy mode (cycle T1). At this time, data "1234" is stored at address 1000 of the memory 300.

The decoding/writing instruction circuits 110 and 210 decode the command transmitted from the processor 410, and then recognize the command as a memory copy command to enable hold signals 112 and 212 for a first address register 120 and a first address register 220 ((d) of FIG. 4). When the hold signals 112 and 212 are enabled, as shown in (e) of FIG. 4, the first address registers 120 and 220 latch address 1000 output from the processor 410 (cycle T2).

After the address 1000 is latched in the first address registers 120 and 220, as shown in (c) of FIG. 4, the first memory managing device 100 transmits data "1234" from address 1000 of the memory 300 to the processor 410 through a data bus 302 (cycle T4).

When the data "1234" is transmitted to the processor 410, the processor 410, as shown in (b) of FIG. 4, transmits an instruction representing a write cycle of a memory copy operation to the decoding/writing instruction circuits 110 and 210 through the control line 900 (cycle T8).

After the decoding/writing instruction circuits 110 and 210 receive this instruction, a second address register 130 and a second address register 230 latch write address 1000 ((f) of FIG. 4). After this address is latched, the decoding/writing instruction circuits 110 and 210 enable signal lines 116 and 216, respectively, ((i) of FIG. 4), and data "1234" is written at address 1000 of the memories 300 and 310 (cycle T9). In this case, when a write instruction of data "ABCD" is transmitted from the processor 410, write access to the memories 300 and 310 is set in a standby state through the control line 900 because the memory copy operation is performed from the memory 300 to the memory 310 in cycle T9.

When the data "1234" is written in the memory 310, as shown in (f) of FIG. 4, the data "1234" is stored at address 1000 (cycle T10).

Write access of data "ABCD" by the processor 410 is enabled, the data "ABCD" is written in the memories 300 and 310 in cycle T11.

Therefore, new data are always stored in the memories.

Figure 5A:
FIGS. 5A, 5B and 5C are views for explaining the types of words.
Figure 5B:
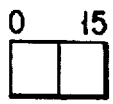
Figure 5C:

Access in a copy write mode described in the first and second embodiments is generally full-word write access on a full-word boundary. In the above embodiments, it is assumed that a normal write access is the full-word write access on the full word boundary. The third embodiment in which the present invention is applied to a case wherein different units of access and different access boundaries are used will be described below. As shown in FIGS. 5A to 5C, the following three different types are considered. That is, assume that one byte is constituted by 8-bit data, a full word is constituted by 4 bytes (i.e., a unit of access is 4 bytes; FIG. 5A), a half word is constituted by 2 bytes (i.e., a unit of access is 2 bytes; FIG. 5B), and a byte word is constituted by 1 byte (i.e., a unit of access is 1 byte; FIG. 5C). In this state, data access is considered.

Figures 6, 7, 8A, 8B:
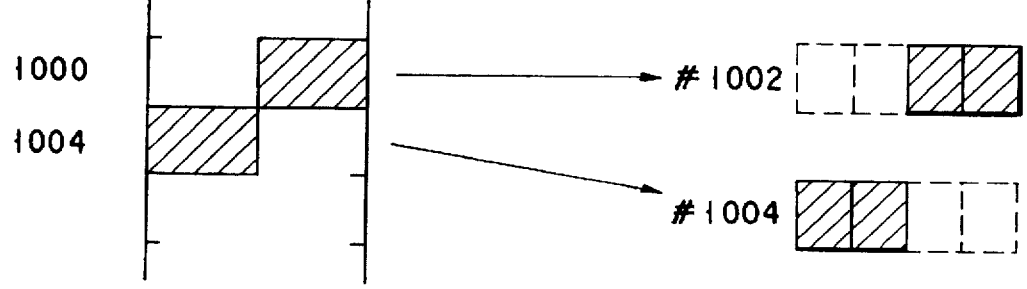
FIG. 6 is a view showing an access boundary for each unit of access.
FIG. 7 is a view showing data on a bus.
FIGS. 8A and 8B are views for explaining an access method in a case wherein full-word access is combined with a half-word boundary.

An access boundary of each data having the above units of access is defined as shown in FIG. 6. Referring to FIG. 6, when one address is defined as one byte, an access boundary of each unit of access is determined as follows.

Since the full-word boundary has a 4-byte unit, the full-word boundary is at addresses 0, 4, 8, and C. Since the half-word boundary has a 2-byte unit, the half-word boundary is at addresses 2, 6, A, and E in addition to the full-word boundary. Since the byte-word boundary has a 1-byte unit, the byte-word boundary is at addresses 1, 3, 5, 7, 9, B, D, and F in addition to the full-word and half-word boundaries.

Combinations between access boundaries and units of access are as follows. Note that, in this embodiment, access means write access. The following combinations between the access boundaries and the units of access are generally used.

In full-word access, the full-word boundary is used as an access boundary.

In half-word access, the full-word boundary and the half-word boundary are used as access boundaries.

In byte-word access, the full-word boundary, the half-word boundary, and the byte-word boundaries are used as access boundaries.

When data is on a bus, the following result is obtained. FIG. 7 is a view showing a case wherein data is on a bus. As shown in FIG. 7, in this embodiment, when the data on the bus has a 32-bit length, assume that the data is present at a position corresponding to an address in a memory as indicated by hatched regions. That is, assume that the data on the bus coincides with the access boundary.

In the combinations between the units of access and access boundaries, combinations between full-word access and half-word boundaries are considered. In this case, as shown in FIG. 8, access is performed by performing half-word access twice on hardware. Therefore, a combination between the half-word access and the full-word boundary and a combination between the half-word access and the half-word boundary are used.

As described above, the types of actual access are as follows.

Figure 9:
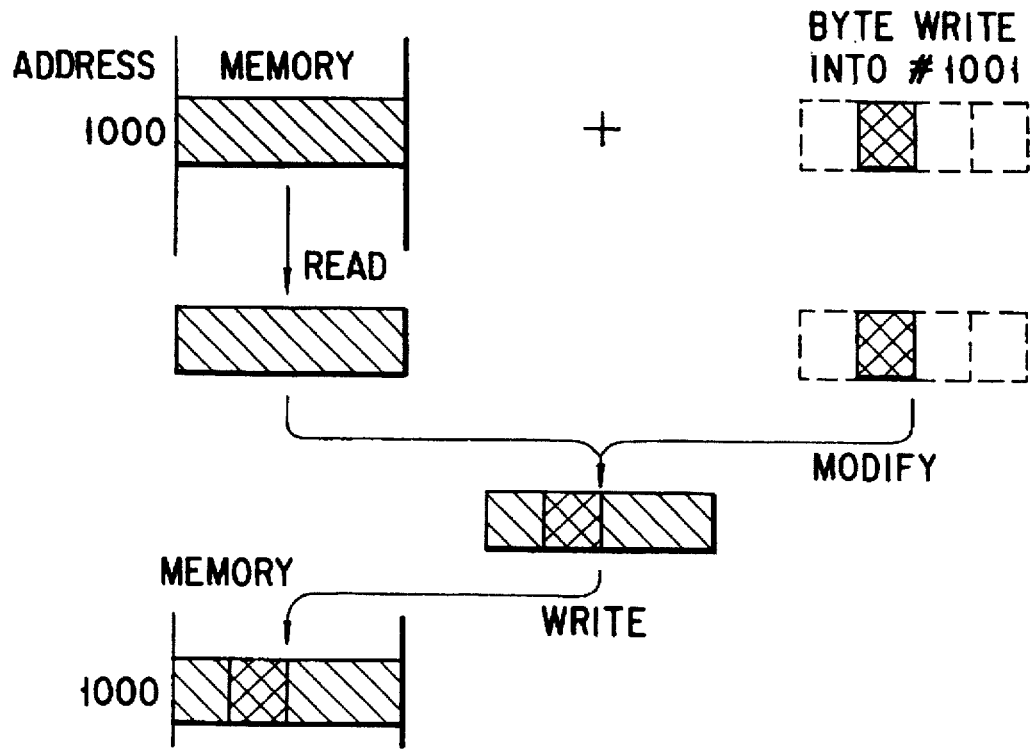
FIG. 9 is a view for explaining a read-modify-write operation.

(1) Full-word access and a full-word boundary (2) Half-word access and full-word and half-word boundaries (3) Byte-word access and full-word, half-word, and byte-word boundaries In the above combinations, combinations (2) and (3) serve as a read/modify/write operation. An example of the read/modify/write operation will be described below with reference to FIG. 9. In FIG. 9, full-word data is read from a memory, the read data is combined with 1-byte-word data on the bus, and the resultant data is written in the memory.

Referring to FIG. 9, full-word data is read from the memory first. When data on the bus is data to be written at address 1001, the data on the bus is written at a portion corresponding to address 1001 of the data read from the memory. New data obtained by combining the readout data with the data on the bus is written in the memory. In this manner, write access in a 1-byte-word unit can be performed.

A copy write operation means that a full word is written on the full-word boundary. For this reason, in combination (1), since an address corresponds to an access region, an address coincidence detector and a method of cancel are simple. This has been described in the first embodiment.

In the third embodiment, combinations (2) and (3) shown in FIG. 9 will be described below. In the third embodiment, unlike the first embodiment, normal write access is within a full word of a copy write operation. For this reason, the functions of the third embodiment different from the functions of the first embodiment are as follows.

(1) It can also be checked whether an address checking operation is performed within the full word. That is, it is checked whether data subjected to a memory copy operation overlaps data to be written by an instruction from a processor. More specifically, a region check function is added to each of the comparators 140 and 240 in the first embodiment. In addition, when a first and second data are transmitted on the bus and the first data is overlapping with at least a part of the second data, signals 142 and 242 output signals indicating overlapping of the data.

(2) If the data do not overlap in (1), normal write access and a copy write operation are performed.

(3) If the data overlap in (1), data obtained by overwriting normal write data on data of the copy write operation is written in the memory. This write access can use a read function in a normal write mode. That is, the read function can be realized by exchanging read data in the read mode to the data of the copy write operation.

Figure 10:
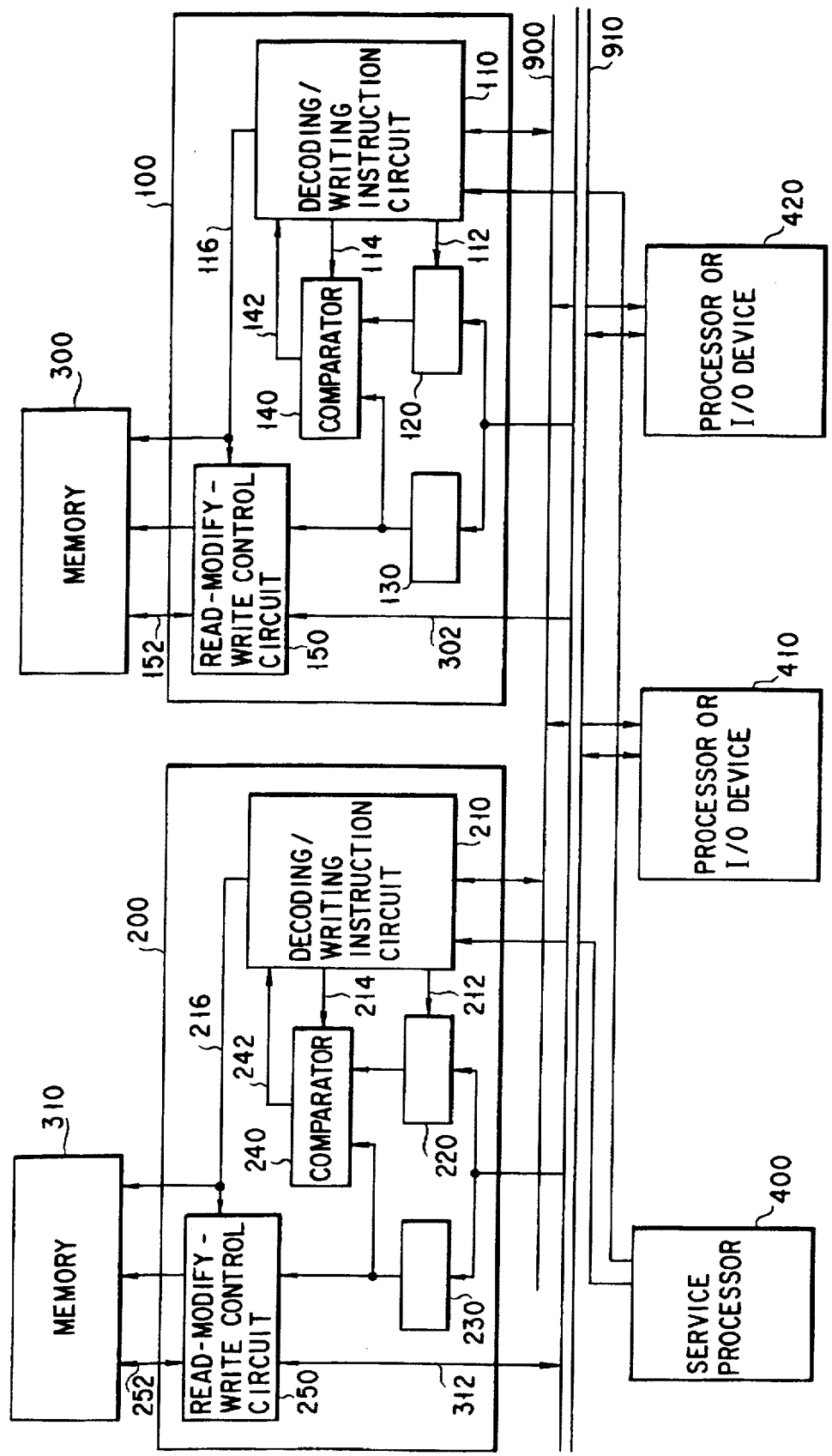
FIG. 10 is a block diagram showing control of a dual-memory managing apparatus according to the third embodiment of the present invention.

FIG. 10 is a block diagram showing control of a dual-memory managing apparatus according to the third embodiment of the present invention. This apparatus has the above functions. FIG. 10 has an arrangement obtained by adding read/modify/write control circuits 150 and 250 to the arrangement in FIG. 1. The same reference numerals as in FIG. 1 denote the same parts in FIG. 10, and a description thereof will be omitted.

Referring to FIG. 10, the read/modify/write operations are performed by the read/modify/write control circuits 150 and 250. The read/modify/write control circuit 150 is arranged between a memory 300 and a data bus 900, and the read/modify/write control circuit 250 is arranged between a memory 310 and the data bus 900. The data bus 900 is connected to the read/modify/write control circuits 150 and 250 through data lines 302 and 312, respectively. The read/modify/write control circuits 150 and 250 are connected to the memories 300 and 310 through data lines 152 and 252, respectively.

Figure 11B:
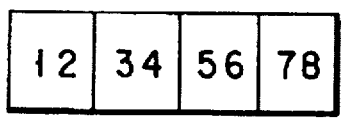
FIGS. 11A including (a) to (l), 11B and 11C are a timing chart showing an operation of the third embodiment of the present invention.
Figure 11C:

An operation of the apparatus according to the third embodiment arranged as described above will be described below with reference to FIGS. 11A including (a) to (l), 11B and 11C. FIGS. 11A is a timing chart showing the operation of the third embodiment of the present invention. FIG. 11A shows an example wherein data of a copy write operation (address 1000) is "12345678", and normal byte-write access (address 1001) is "--AB----". FIGS. 11B and 11C represent contents of data 11B and 11C on bus shown in (c) of FIG. 11A, respectively.

A service processor 400 transmits a command to decoding/writing instruction circuits 110 and 210 through corresponding signal lines 412 and 414. The command represents that the memory 300 is a copy source, and the memory 310 is a copy destination. After the command is transmitted from the service processor 400, a processor 410 reads address 1001 in a memory copy mode ((a) of FIG. 11A). The control line 900 connected to a processor 410 or 420 shown in (b) of FIG. 11A shows a function representing a read cycle of a memory copy operation (cycle T1). At this time, "12345678" is stored at address 1000 of the memory 300.

The decoding/writing instruction circuits 110 and 210 decode the command transmitted from the processor 410, and then enable hold signals 112 and 212 for first address registers 120 and 220 ((d) of FIG. 11A). When the hold signals 112 and 212 are enabled, as shown in (e) of FIG. 11A, the first address registers 120 and 220 latch address 1000 from the processor 410 (cycle T2).

After address 1000 is latched in the first address registers 120 and 220, the first memory managing device 100, as shown in (c) of FIG. 11A, transmits the data "12345678" (shown in FIG. 11B) from address 1000 of the memory 300 to the processor 410 through the data bus 302 (cycle T4).

When a normal write instruction of 1-byte data "AB" (shown in FIG. 11C) at address 1001 is transmitted (cycle T6), address 1001 is latched in second address registers 130 and 230 (cycle T7). At this time, outputs from the comparators 140 and 240 indicate overlapping of the data, and write access is set in a standby state (cycle T7).

When copy write instruction is output from the processor 410, the second address register 130 and the second address register 230 latch write addresses 1000 ((f) of FIG. 11A, cycle T8 and T9). After address 1000 is latched, the decoding/writing instruction circuits 110 and 210 enable signal lines 116 and 216 ((f) of FIG. 11A). The data "12345678" on the bus is transferred to each of the read control circuits 150 and 250, and each of the read control circuits 150 and 250 combines the 1-byte data "AB" with the data "123455678" to form data "12AB5678". This data "12AB5678" is written at address 1000 of the memory 310 (cycle T9).

When the data "12AB5678" is written, as shown in (f) of FIG. 11A, the data "12AB5678" is stored at address 1000 of the memory 310 (cycle T10).

Although the above embodiment has been described on the basis of a 1-byte word, an operation on the basis of a half word can be equally performed.

As has been described above, according to the present invention, since a memory copy operation is performed in a unit of address, write access can be freely performed to an address which is not copied. For this reason, the memory copy operation does not require a long period of time. In addition, since the memory copy operation is determined by only a coincidence between a read address and a write address, a hardware arrangement can be simplified, and an apparatus can be easily controlled by software.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A dual-memory managing apparatus including a plurality of dual-memory managing devices, each of which connected between a corresponding one of a plurality of memories and a data bus, and in which a plurality of processors are connected to the data bus, and applied to a system constituted such that identical data are stored in said plurality of memories, said dual-memory managing apparatus performing control when a memory copy operation is performed from at least one first memory to at least one second memory, each of said plurality of dual-memory managing devices comprising:

means for performing the memory copy operation for each word; and when write access of said plurality of processors to said plurality of memories is performed at almost the same timing as that of the memory copy operation, control means for concurrently performing the memory write access and the memory copy operation when an address of the write access is different from an address subjected to the memory copy operation, and for preferentially performing the write access when the write address is identical to the address subjected to the memory copy operation.

2. An apparatus according to claim 1, further comprising:

means for writing data in said plurality of memories after a corresponding portion of contents of the memory copy operation is replaced with contents of the write access when the write access is shorter than a word length subjected to the memory copy operation, and the write address is included in the address subjected to the memory copy operation.

3. An apparatus according to claim 1, wherein, when the write address coincides with the address subjected to the memory copy operation, and the memory copy operation is performed before the write access is performed, said control means includes means for setting the write access in a standby state and performing write access to said plurality of memories upon completion of the memory copy operation.

4. An apparatus according to claim 3, further comprising:

means for writing data in said plurality of memories after a corresponding portion of contents of the memory copy operation is replaced with contents of the write access when the write access is shorter than a word length subjected to the memory copy operation, and the write address is included in the address subjected to the memory copy operation.

5. An apparatus according to claim 1, wherein said control means includes means for canceling the copy operation of the address when the write address coincides with the address subjected to the memory copy operation, and the write access is performed before the memory copy operation is performed.

6. An apparatus according to claim 5, further comprising:

means for writing data in said plurality of memories after a corresponding portion of contents of the memory copy operation is replaced with contents of the write access when the write access is shorter than a word length subjected to the memory copy operation, and the write address is included in the address subjected to the memory copy operation.

7. In a system which has a plurality of memories and a plurality of processors connected to each other through a data bus, and a plurality of dual-memory managing devices respectively connected between the plurality of memories and the data bus, and is constituted such that identical data are stored in said plurality of memories, a dual-memory managing method adapted to each of said plurality of dual-memory managing devices for performing control when a memory copy operation is performed from at least one first memory to at least one second memory, comprising:

the first step of transmitting a write address and a read address for performing the memory copy operation from one of said plurality of processors;

the second step of comparing the read address with the write address; and the third step of performing the memory copy operation on the basis of a comparison result;

wherein the third step includes the step of performing the write access to said memories upon completion of the memory copy operation when a write instruction is transmitted from one of said plurality of processors to said plurality of memories during the memory copy operation.

8. A method according to claim 7, wherein the third step further includes the step of writing data in said plurality of memories after a corresponding portion of contents of the memory copy operation is replaced with contents of the write access when the write access is shorter than a word length subjected to the memory copy operation, and the write address is included in the address subjected to the memory copy operation.

9. In a system having a plurality of memories and a plurality of processors connected to each other through a data bus and constituted such that identical data are stored in said plurality of memories, a dual-memory managing method for controlling a memory copy operation performed from at least one first memory to at least one second memory, comprising:

the first step of transmitting a write address and a read address for performing the memory copy operation from one of said plurality of processors;

the second step of comparing the read address with the write address; and the third step of performing the memory copy operation on the basis of a comparison result of the second step;

wherein the third step includes the step of canceling the memory copy operation upon completion of the write access to said memories when a write instruction, whose address is identical to said write address of the memory copy operation, is transmitted from one of said plurality of processors to said plurality of memories when the memory copy operation is performed.

10. A method according to claim 9, wherein the third step further includes the step of writing data in said plurality of memories after a corresponding portion of contents of the memory copy operation is replaced with contents of the write access when the write access is shorter than a word length subjected to the memory copy operation, and the write address is included in the address subjected to the memory copy operation.

* * * * *